F. & A. SHUMAN.
WIRE GLASS STRUCTURE.
APPLICATION FILED MAR. 20, 1905.
905,469.
Patented Dec. 1, 1908.
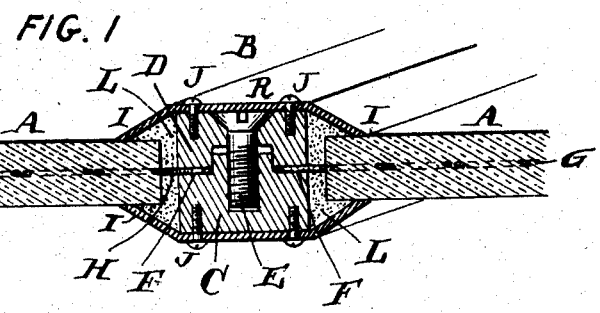
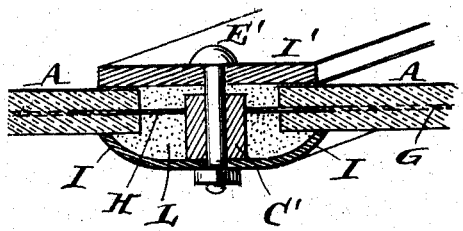
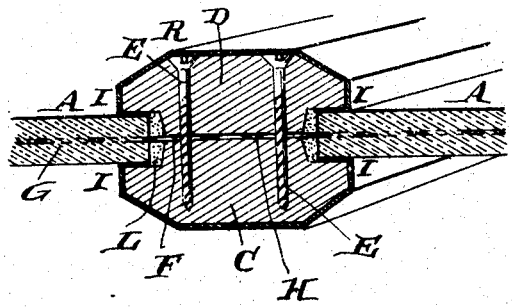
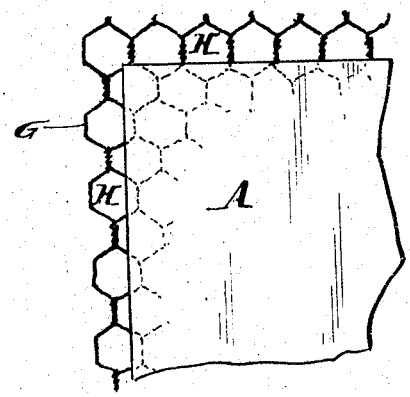
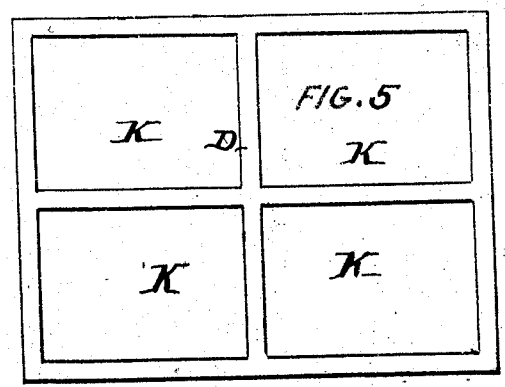
Attest
Inventors
Frank Shuman &
Arno Shuman
By Their Atty ically in forming the glass plate with the
UNITED STATES PATENT OFFICE.

FRANK SHUMAN, OF PHILADELPHIA, AND ARNO SHUMAN, OF CONNELLSVILLE, PENNSYLVANIA, ASSIGNORS TO CONTINUOUS GLASS PRESS COMPANY, A CORPORATION OF NEW JERSEY.

WIRE-GLASS STRUCTURE.

No. 905,469.

Specification of Letters Patent.

Patented Dec. 1, 1908.

Application filed March 20, 1905. Serial No. 250,978.

*To all whom it may concern:*

Be it known that we, FRANK SHUMAN, of Philadelphia, county of Philadelphia, State of Pennsylvania, and ARNO SHUMAN, of Connellsville, Fayette county, Pennsylvania, have invented an Improvement in Wire-Glass Structures, of which the following is a specification.

Our invention has reference to wire glass and frames therefor and consists of certain improvements which are fully set forth in the following specification and shown in the accompanying drawings, which form a part thereof.

Heretofore, it has been customary to form the wire glass with the wire mesh terminating at the edge of the glass and then setting such sheet of wire glass in a metal frame and securing it in place by applying a cement to the edge of the glass and the frame and applying over said cement a metallic strip or cap to cover it. In such a construction the union of the glass with the metal frame or cement or both was poor and liable at all times to become worse by wear; and in the case of breakage during fires or other severe casualties there was no support for the glass that would prevent it being forced out of its frame.

The object of our invention is to provide a union between the metallic mesh or wire or both, such that the glass is positively and firmly held to the sash frame whether it is made of metal or wood.

In construction our invention consists primarily in forming the glass plate with the meshed wire center extended beyond the edges, and secondly in securing said plate of wire glass in a metallic or other frame by supporting the glass in contact with one or more flexible or yielding flanges of metal of the frame and securing the extended meshed wire in cement or clamps, or both, forming part of the supporting frame. The cement is inclosed in the sash frame and by hardening where it extends through the loops of the meshed wire it acts as a positive supporting and locking medium between the glass and frame.

Our invention also comprehends details of construction which, together with the features above specified, will be better understood by reference to the drawings, in which:

Figure 1 is a perspective sectional view of our improved wire glass and suspension frame; Fig. 2 is a perspective sectional view of a modification of same; Fig. 3 is a plan view of a sheet of our improved wire glass for use in connection with the frame shown in Figs. 1 and 2; Fig. 4 is a perspective sectional view of a modification of our invention; and Fig. 5 is a plan view of a portion of the frame.

A A are two sheets of wire glass to be united and are provided with the center of meshed wire G having its edges extending beyond the edge of the glass to form a metallic edge of open or looped structure H. These sheets of wire glass are clamped in position by a suitable frame, preferably of metal and cement, the latter extending through the open or looped extension of the meshed wire.

C and D are two metallic frames having clamping edges F and adapted to be drawn together by screws E. These frames may be formed in one or more panels as desired to suit the requirements. In Fig. 5 they are shown in four panels. These frames C and D are provided with sheet metal strips R having flexible flanges or edges I which extend over and press upon the glass itself. The strip R for the lower frame C is secured in place by the screws J or otherwise and then the cement L is forced in around the edges of the glass and through the meshes of the meshed wire H. The upper strip R is then placed in position over the cement and screwed down into place and the excess of cement is squeezed out from under the edges of the flanges I and removed. In this manner the glass is positively held by the gripping action of the parts C and D and retaining action of the hardened cement upon the meshed wire H, and the glass body itself is caused to centralize itself between the flanges I I of the strips R R.

Under no conditions can the glass be pulled out of the frame even where, by great pressure, its center was crushed and bent under strain. Where the glass is simply put into place like ordinary window glass, as heretofore, there was nothing to prevent it being forced out of its frame. The present improvement is especially important in case of fires in which occurrences drafts must be guarded against. In addition to such advantage there is greatly less danger to breakage in setting the glass.

In the structure shown in Fig. 2 the frame C supports the lower strip R having the flexible flanges upon which the glass sheets rest. The space within the strip R and between the glass sheets is then filled with cement L and a cap plate or frame I' placed over the space between the glass sheets and clamped in place upon the cement by bolts E'. In this case the edges of the meshed wire H are not gripped by metal clamps, but the cement L extends through the meshes of the wire H and firmly holds the same to the frame as before described. This construction is lighter and cheaper than that of Fig. 1 and is perhaps more suitable for smaller windows. The cement when hard and confined within the metal frame forms a very strong connection for holding the wire glass to the frame.

In some cases a very light frame is necessary and to secure this result I may make the structure as shown in Fig. 4. In this case the two frames C and D are made of wood and secured together by the screws or nails E, which being thin, may be passed through the open wire mesh H whereby it not only is clamped between the parts C and D but also pinned in place to prevent its being pulled out of the sash frame. These wooden frames C and D are covered with sheet zinc, copper or galvanized iron as shown at R and the edges thereof are bent down around the edge of the wood to become clamped between the glass and the wood as shown. In this case there is a backing of wood above the glass, but the flexibility of the wood and metal covering strips give sufficient elasticity to enable them to adapt themselves to the glass plate. Cement L may be employed between the glass and frame and through the meshed wire H as before described if so desired. In practice the part C has its metal covering in place before the sheets of glass are laid upon it. The upper frame D is then placed in position and fastened with the screws F. The upper sheet metal covering R is then placed over the frame D and the lower edges I I forced between the glass and overhanging parts of the wooden frame. To enable this to be done the wood must not press too tightly upon the glass. Ordinarily a reasonable space may be allowed which being filled with cement will receive the lower flanges of the metal strips R and make liquid tight joints. In all of these cases, given as examples of the adaptability of our invention, the joint is not only secure against the glass being pulled out of the sash but is perfectly water tight and durable.

While we have shown the structures comprising wire glass with an intermediate sash frame, it will be understood that it is not at all necessary that the sash shall include more than the edge of one sheet, especially would this be the case in the outer bounding frames of the sash.

It is evident that the frames may be modified in many ways without departing from the essential features of our invention, therefore we do not restrict ourselves to the particular structures herein illustrated.

We do not claim in this application a sheet of wire glass for attachment to a sash frame consisting of a glass sheet having a meshed wire center extending beyond the edges of the glass to form looped portions, as said subject matter is reserved for a separate application.

What we claim as new and desire to secure by Letters Patent, is:—

1. The combination of a window sash formed in two parts between which the edge of the glass is placed, with a plate of wire glass having meshed wire extending beyond its edge and within the space between the two parts of the sash frame, and means within the sash frame for securely holding the meshed wire to prevent the glass being pulled from the sash frame.

2. The combination of a window sash formed in two parts between which the edge of the glass is placed, with a plate of wire glass having meshed wire extending beyond its edge and within the space between the two parts of the sash frame, and cement within the sash frame extending through the meshed wire for securely holding the meshed wire to prevent the glass being pulled from the sash frame.

3. The combination of a plate of wire glass having a metallic center extended beyond its edge, with a sash frame formed of two parts clamping the said extended metallic center of the glass, and means for drawing the two parts of the sash frame together.

4. The combination of a plate of wire glass having a metallic center extended beyond its edge, with a sash frame formed of two parts clamping the said extended metallic center of the glass, and means for drawing the two parts of the sash frame together, and a metallic covering strip having flexible edges extending over and resting upon the glass.

5. The combination of a plate of wire glass having a metallic center extended beyond its edge, with a sash frame formed of two parts clamping the said extended metallic center of the glass, and means for drawing the two parts of the sash frame together, metallic covering strips having flexible edges extending over and resting upon the glass, and cement within the sash frame and extending through and around the extended portions of the metallic center.

6. The combination of a plate of wire glass having a metallic center extended beyond its edges, with a sash frame to support the glass directly and provided with clamping parts acting transversely to the plane of the glass for holding the extended metallic center whereby the glass cannot be pulled out of the sash frame.

7. The combination of two sheets of wire glass having their adjacent edges provided with meshed wire extensions, with a sash frame formed of two parts clamped together upon the meshed wire extensions to hold the two sheets of glass together.

8. The combination of two sheets of wire glass having their adjacent edges provided with meshed wire extensions, with a sash frame formed of two parts clamped together upon the meshed wire extensions to hold the two sheets of glass together, and flexible strips covering the clamping parts and having their edges resting upon the glass sheets.

9. The combination of two sheets of wire glass having their adjacent edges provided with meshed wire extensions, with a sash frame formed of two parts clamped together upon the meshed wire extensions to hold the two sheets of glass together, flexible strips covering the clamping parts and having their edges resting upon the glass sheets, and cement within the sash frame and extending through the meshes of the meshed wire extensions.

10. A sheet of wire glass consisting of a glass sheet having a meshed wire center extended beyond the edges of the glass in the form of connected looped portions, in combination with a sash frame having parts upon which the loop portions of the meshed wire of the glass directly rest and to which they are attached.

11. A sheet of wire glass having its edges provided with metallic looped portions extending outward beyond said edges, in combination with a sash frame having parts upon which the metallic looped portions directly rest and to which they are attached.

12. A sheet of wire glass having its edges intermediate of the planes of its surfaces provided with outwardly extending looped metallic parts, combined with two part frames clamping said extended looped parts between them, and means for uniting the two parts of the frame.

13. A sash or frame glazed with wire glass from which the wire projects and is connected to the sash or frame by means of a member or members inserted through one or more of the projecting wire loops and resting on or connected to one or more members of the sash.

In testimony of which invention, I hereunto set my hand.

FRANK SHUMAN.

Witnesses:
R. M. HUNTER,
R. M. KELLY.

In testimony of which invention, I hereunto set my hand.

ARNO SHUMAN.

Witnesses:
M. D. WILLIAMS,
W. H. WILLIAMS.